United States Patent
Hokari

(10) Patent No.: US 10,977,584 B2
(45) Date of Patent: Apr. 13, 2021

(54) INFORMATION PROCESSING APPARATUS INFORMATION PROCESSING METHOD AND STORAGE MEDIUM

(71) Applicant: GURUNAVI, INC., Tokyo (JP)

(72) Inventor: Shoko Hokari, Matsumoto (JP)

(73) Assignee: GURUNAVI, INC., Tokyo (JP)

( * ) Notice: Subject to any disclaimer, the term of this patent is extended or adjusted under 35 U.S.C. 154(b) by 229 days.

(21) Appl. No.: 15/895,038

(22) Filed: Feb. 13, 2018

(65) Prior Publication Data

US 2018/0232666 A1 Aug. 16, 2018

(30) Foreign Application Priority Data

Feb. 16, 2017 (JP) .............................. JP2017-027367
Nov. 7, 2017 (JP) .............................. JP2017-214339

(51) Int. Cl.
*G06Q 10/10* (2012.01)
*G01C 21/36* (2006.01)
(Continued)

(52) U.S. Cl.
CPC ............. *G06Q 10/02* (2013.01); *G01C 21/34* (2013.01); *G01C 21/3673* (2013.01);
(Continued)

(58) Field of Classification Search
CPC ...... G06Q 10/00; G06Q 10/02; G06Q 10/109; G06Q 10/047; G06Q 10/06311;
(Continued)

(56) References Cited

U.S. PATENT DOCUMENTS 6,009,403 A * 12/1999 Sato ..................... G01C 21/343
340/990
8,024,111 B1 * 9/2011 Meadows .......... G01C 21/3492
340/905
(Continued)

FOREIGN PATENT DOCUMENTS

EP 0785537 A1 7/1997
EP 1152220 A1 11/2001
(Continued)

OTHER PUBLICATIONS

"How to search along rout route in Apple Maps," by Christian Zibreg, Nov. 7, 2016. (Year: 2016).*
(Continued)

*Primary Examiner* — George Chen
*Assistant Examiner* — Brian Adams Heflin
(74) *Attorney, Agent, or Firm* — Sughrue Mion, PLLC

(57) ABSTRACT

An information processing apparatus includes a control circuity that judges that a mealtime of a user is included between a schedule time of departure of a mobile object that travels while carrying the user and a schedule time of arrival of the mobile object, estimates a location where the mobile object is traveling during the mealtime, and generates search conditions of restaurant search for extracting restaurants located within a first distance from the estimated location where the mobile object is traveling and located a second distance away from at least one of a point of departure and a destination of the mobile object, from restaurant information associated with location information.

15 Claims, 12 Drawing Sheets

(51) Int. Cl.
| | |
|---|---|
| *H04W 4/02* | (2018.01) |
| *G06Q 10/04* | (2012.01) |
| *G06Q 30/02* | (2012.01) |
| *G06Q 10/02* | (2012.01) |
| *G01C 21/34* | (2006.01) |
| *H04W 4/021* | (2018.01) |
| *G06F 16/9537* | (2019.01) |
| *G06F 16/9538* | (2019.01) |
| *G06Q 50/14* | (2012.01) |
| *G06Q 50/12* | (2012.01) |

(52) U.S. Cl.
CPC ..... *G01C 21/3679* (2013.01); *G06F 16/9537* (2019.01); *G06F 16/9538* (2019.01); *G06Q 10/047* (2013.01); *G06Q 10/109* (2013.01); *G06Q 30/0205* (2013.01); *G06Q 50/14* (2013.01); *H04W 4/021* (2013.01); *H04W 4/023* (2013.01); *G06Q 50/12* (2013.01); *H04W 4/02* (2013.01)

(58) Field of Classification Search
CPC ............ G06Q 10/06395; G06Q 50/12; G06Q 10/0631; G06Q 30/016; G06Q 50/01; G01C 21/34; G01C 21/3679; G01C 21/3673; G01C 21/3688; H04W 4/02; H04W 4/021; H04W 4/023; G06F 16/29; G06F 16/9537; G05B 2219/45111; G05B 19/0428; G05B 15/02; G05B 2219/23301; G08B 27/001; G08B 27/006
See application file for complete search history.

(56) References Cited

U.S. PATENT DOCUMENTS

| | | | | |
|---|---|---|---|---|
| 9,568,331 | B1* | 2/2017 | Narang | G01C 21/3617 |
| 2004/0260466 | A1* | 12/2004 | Ichihara | G01C 21/343 |
| | | | | 701/420 |
| 2009/0157289 | A1* | 6/2009 | Graessley | B60L 3/12 |
| | | | | 701/123 |
| 2009/0240429 | A1* | 9/2009 | Tanaka | G01C 21/3682 |
| | | | | 701/533 |
| 2017/0228667 | A1* | 8/2017 | Duschl | G06Q 10/025 |

FOREIGN PATENT DOCUMENTS

| | | | |
|---|---|---|---|
| GB | 2338780 | A | 12/1999 |
| JP | 2002-243467 | A | 8/2002 |
| JP | 2002243467 | * | 8/2002 |
| JP | 2002-310686 | A | 10/2002 |
| JP | 2002-328039 | A | 11/2002 |
| JP | 2003-322532 | A | 11/2003 |
| JP | 2005-037143 | A | 2/2005 |
| JP | 2005037143 | * | 2/2005 |
| JP | 2005-114673 | A | 4/2005 |
| JP | 2007-316033 | A | 12/2007 |
| JP | 2007316033 | A | 12/2007 |
| JP | 2010-32514 | A | 2/2010 |
| JP | 2010-204111 | A | 9/2010 |
| JP | 4952750 | B2 * | 6/2012 |
| JP | 4952750 | B2 | 6/2012 |
| JP | 2013-195244 | A | 9/2013 |
| JP | 2014-211705 | A | 11/2014 |
| JP | 2015164353 | A | 9/2015 |
| JP | 2016-024166 | A | 2/2016 |

OTHER PUBLICATIONS

Partial Communication dated Jul. 24, 2018, from the European Patent Office in counterpart European Application No. 18155515.2.
Communication dated Jul. 3, 2018, from the Japanese Patent Office in counterpart application No. 2017-214339.
Communication dated Oct. 29, 2019, from the Japanese Patent Office in application No. 2017-214339.
English Translation of Japanese Publication No. 2007-316033 published on Dec. 6, 2007.
Communication dated Jan. 14, 2020, from the Japanese Patent Office in Application No. 2019-043599.
Prior Art Search dated Dec. 21, 2016 in Japanese Application No. 2017-027367.

* cited by examiner

FIG. 3

| BASIC INFORMATION OF ESTABLISHMENT ||
|---|---|
| ESTABLISHMENT IDENTIFICATION INFORMATION | R012345678 |
| NAME | RESTAURANT α |
| TYPE | ITALIAN |
| LOCATION INFORMATION | COORDINATES (x2, y2) |
| ⋮ | ⋮ |

DIAGRAM ILLUSTRATING EXAMPLE OF USE CASE

INFORMATION PROCESSING APPARATUS INFORMATION PROCESSING METHOD AND STORAGE MEDIUM

INCORPORATION BY REFERENCE

The disclosures of Japanese Patent Application Nos. 2017-214339 filed on Nov. 7, 2017and 2017-027367 filed on Feb. 16, 2017, are is incorporated herein by reference in their entirety.

BACKGROUND OF THE INVENTION

1. Field of the Invention

The present technology relates to an information processing apparatus, an information processing method and a storage medium having a program stored therein that allow for providing restaurant information to a user.

2. Description of Related Art

In a technical field of a system that presents information if a point of departure and a destination are designated, in related art, it is common that various kinds of service around the destination are searched for. For example, Japanese Patent Application Publication No. 2014-211705 and Japanese Patent Application Publication No. 2016-024166 disclose technologies of presenting an appropriate parking lot around a destination to a driver. Here, concerning service of a pay-by-the-hour parking lot, service around the destination is searched for in both disclosures.

Japanese Patent Application Publication No. 2005-037143 discloses, in a car navigation apparatus, in order to set a route on which a number of restaurants are located along the road as a guiding route during a mealtime, in the case where a meal start time is included between a time at which the guiding route is searched for and an arrival time to a destination, searching for a route on which a larger number of restaurants are located along the road through which a user is to pass at the meal start time.

SUMMARY OF THE INVENTION

However, with the related art as described above, in the case where the service is service (for example, lunch) that is provided at a substantially fixed time of the day, because there is little meaning in proposing provision of service at a time deviating from the fixed time (there is no meaning in presenting recommended lunch after lunch time), there is a case where the proposal does not become an appropriate proposal. Further, while there is a desire for finding a new and good restaurant while making a side trip from a point of departure to a destination, the related arts as described above cannot satisfy the desire.

An object of the present invention is to provide an information processing apparatus, an information processing method and a storage medium having a program stored therein that enable proposal of a meal at a location away from a point of departure or a destination.

One aspect of the present technology for achieving the object is an information processing apparatus including a control circuity that performs the following processing.

Judging that a mealtime of a user is included between a schedule time of departure of a mobile object that travels while carrying the user and a schedule time of arrival of the mobile object.

Estimating a location where the mobile object is traveling during the mealtime.

Generating search conditions of restaurant search for extracting restaurants located within a first distance from the estimated location where the mobile object is traveling and located a second distance away from at least one of a point of departure and a destination of the mobile object, from restaurant information associated with location information.

According to the configuration, by estimating a location where the mobile object that travels while carrying the user is traveling during a "mealtime" that corresponds to a period of time appropriate for meal and searching for restaurants located within a first distance from the location and located a second distance away from at least one of the point of departure and the destination of the mobile object, it becomes possible to search for a new restaurant while making a side trip from the point of departure to the destination during travel.

Further, another aspect of the present technology is an information processing method to be executed by a processing circuity of an information processing apparatus.

The processing circuity executes the following processing.

Judging that a mealtime of a user is included between a schedule time of departure of a mobile object that travels while carrying the user and a schedule time of arrival of the mobile object.

Estimating a location where the mobile object is traveling during the mealtime.

Generating search conditions of restaurant search for extracting restaurants located within a first distance from the estimated location where the mobile object is traveling and located a second distance away from at least one of a point of departure and a destination of the mobile object, from restaurant information associated with location information.

Further, another aspect of the present technology is a non-transitory tangible computer-readable storage medium having a program stored therein, the program causing a processing circuity of an information processing apparatus to execute the following processing.

A procedure of judging that a mealtime of a user is included between a schedule time of departure of a mobile object that travels while carrying the user and a schedule time of arrival of the mobile object.

A procedure of estimating a location where the mobile object is traveling during the mealtime.

A procedure of generating search conditions of restaurant search of extracting restaurants located within a first distance from the estimated location where the mobile object is traveling and located a second distance away from at least one of a point of departure and a destination of the mobile object, from restaurant information associated with location information.

As described above, according to the present technology, it is possible to provide an information processing apparatus, an information processing method and a storage medium having a program stored therein that enable proposal of a meal at a location away from a point of departure or a destination.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3 is a diagram illustrating an example of a data structure of an establishment database illustrated in FIG. 2;

DETAILED DESCRIPTION OF EMBODIMENTS

Embodiments of the present technology will be described below with reference to the drawings.

First Embodiment

<Hardware Configuration Example>

Figure 1:
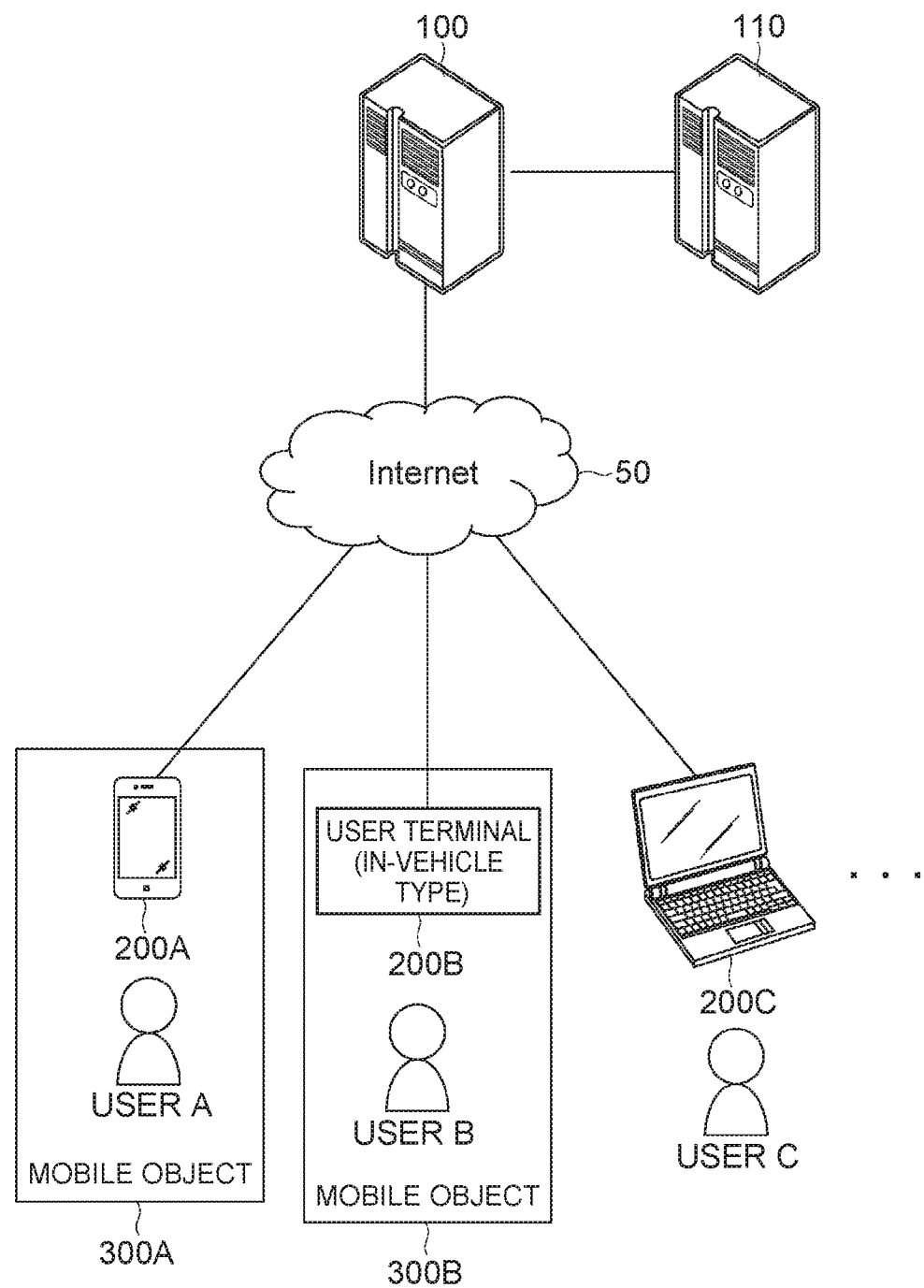
FIG. 1 is a diagram illustrating a configuration of a restaurant information providing system according to an embodiment of the present technology.

FIG. 1 illustrates a network configuration example of a restaurant information providing system 1 according to the present embodiment. As illustrated in FIG. 1, in the restaurant information providing system 1 according to the present embodiment, a restaurant information providing server 100 is capable of communicating with a user terminal 200 via the Internet 50. The restaurant information providing server 100 is an example of a hardware resource that realizes the information processing apparatus according to the present technology, in the present embodiment.

In FIG. 1, the restaurant information providing server 100 can utilize a route search server 110. The route search server 110 includes a geographical information database 31 (illustrated in FIG. 4). The route search server 110 returns one or more routes R that connect a point of departure and a destination when the route search server 110 receives a route search instruction command in which at least geographical information on the point of departure and geographical information on the destination from other servers including the restaurant information providing server 100 are set as parameters via an application program interface, or the like.

Note that the Internet 50 is an example of a network that mediates the restaurant information providing server 100 and the user terminal 200 in the present embodiment, and such a network may include a network connecting base stations of mobile wireless communication, an intranet, or the like.

Note that the user terminal 200 is name in the case where at least one of a user terminal 200A used by a user A illustrated in FIG. 1, a user terminal 200B used by a user B, a user terminal 200C used by a user C, . . . is referred to without being estimated.

In the present embodiment, it is assumed that a user gets on a mobile object 300 to travel from the point of departure to the destination. However, it is not essential that part or the whole of the restaurant information providing system 1 is physically or functionally included in the mobile object 300. FIG. 1 illustrates the user terminal 200 as part of the restaurant information providing system 1.

In FIG. 1, an in-vehicle type user terminal 200 is illustrated as an example of the user terminal 200B. The user terminal 200B may be mounted on the mobile object 300B and, for example, may include a function as a car navigation terminal.

Figure 2:
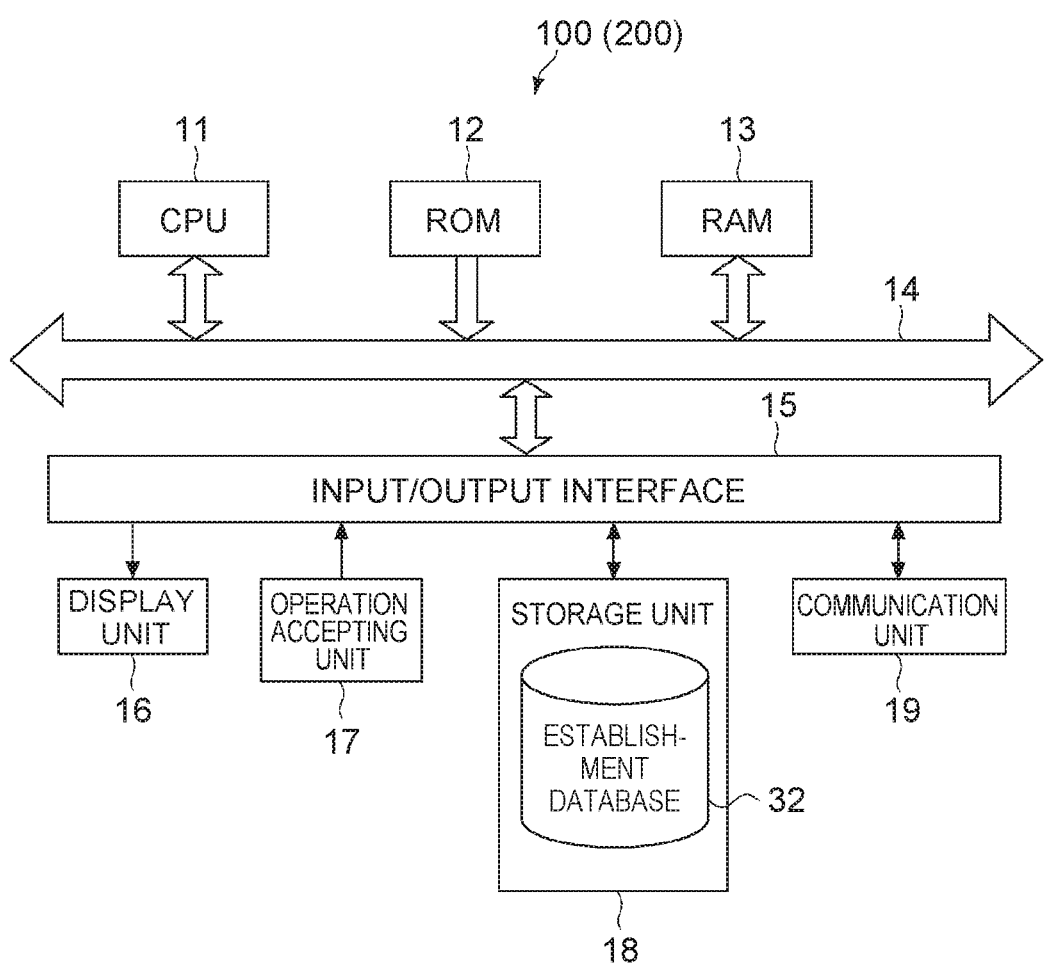
FIG. 2 is a diagram illustrating a hardware configuration example of a server and a user terminal included in FIG. 1.

Referring to FIG. 2, a hardware configuration example of the restaurant information providing server 100 and the user terminal 200 is illustrated. In the following description, description will be provided assuming that the configuration example illustrated in FIG. 2 is a configuration example of the restaurant information providing server 100. As illustrated in FIG. 2, as the hardware of the restaurant information providing server 100, a processing control unit may be configured by a CPU (Central Processing Unit) 11, a ROM (Read Only Memory) 12 and a RAM (Random Access Memory) 13 being connected via a bus 14.

The processing control unit configured with various kinds of hardware connected to the bus 14 may be further connected to an input/output interface 15. The input/output interface 15 may be connected to a display unit 16, an operation accepting unit 17, a storage unit 18 and a communication unit 19.

Various kinds of hardware connected to the input/output interface 15 function as an input/output unit that inputs/outputs information to/from the restaurant information providing server 100. Aspects of input/output of information to/from the restaurant information providing server 100 include input/output of information to/from the processing control unit configured with various kinds of hardware connected to the bus 14.

The display unit 16 provides a function of table output to the restaurant information providing server 100, and, specifically, is implemented with combination of, for example, a liquid crystal display, a graphic controller, or the like. The operation accepting unit 17 provides a function of inputting user operation to the restaurant information providing server 100, and, specifically, is implemented with, for example, a liquid crystal touch panel, a keyboard device, or the like.

The storage unit 18 provides a function of secondary storage to the restaurant information providing server 100, and, specifically, is implemented with, for example, a hard disk device, SSD (Solid State Disks), or the like. The communication unit 19 provides a function of communicating with an external apparatus, a function of inputting/outputting information using the function of communicating, or the like, to the restaurant information providing server 100. Specifically, the communication unit 19 is implemented with, for example, a local area network device, in which case the communication unit 19 can be implemented regardless of types of a physical layer such as wired and wireless.

Further, the storage unit 18 includes an establishment database 32. Referring to FIG. 3, an example of a data structure of the establishment database 32 is illustrated. Note that information stored in the storage unit 18 may be regarded as data held by the restaurant information providing server 100. Note that, even if a configuration is employed where the establishment database 32 is provided at an external data server (not illustrated), and the CPU 11 makes an inquiry for search to the external data server as needed, effects equivalent to those of this embodiment can be also provided.

Referring to FIG. 3, an example of a data structure of information for each establishment stored in the establishment database 32 is illustrated. In the establishment database 32, establishment identification information, names, types, location information, or the like, are stored for each establishment registered in advance in the restaurant information providing server 100. Here, the type means tendency of dishes served at the establishment (such as Italian, Japanese and Chinese), a service providing form (Japanese style pub, fast food, buffet style, or the like), or the like. The type may be combination of information on the tendency of dishes, the service providing form, or the like.

"Location information" described in FIG. 3 includes a geographical coordinate system indicated with latitude and longitude. The location information may also include address information expressed with town name and block number, street number and block number, or the like. Further, the location information may include information in a height direction (such as a floor where the establishment is located).

Technical effects provided by the above-described hardware configuration being employed will be described. In the present embodiment, hardware resources are saved by the restaurant information providing server 100 accepting all traffic from a plurality of user terminals 200. For example, it is also possible to cause the user terminal 200 alone to exert operational effects of the present technology by all information processing to be executed by the restaurant information providing server 100 being executed by the user terminal 200. However, compared to such an aspect, by employing a hardware configuration illustrated in FIG. 1 to FIG. 3, it is not necessary to prepare resources required to execute information processing to be executed by the restaurant information providing server 100 at each of the plurality of user terminals 200.

<Software Program Configuration Example>

Figure 4:
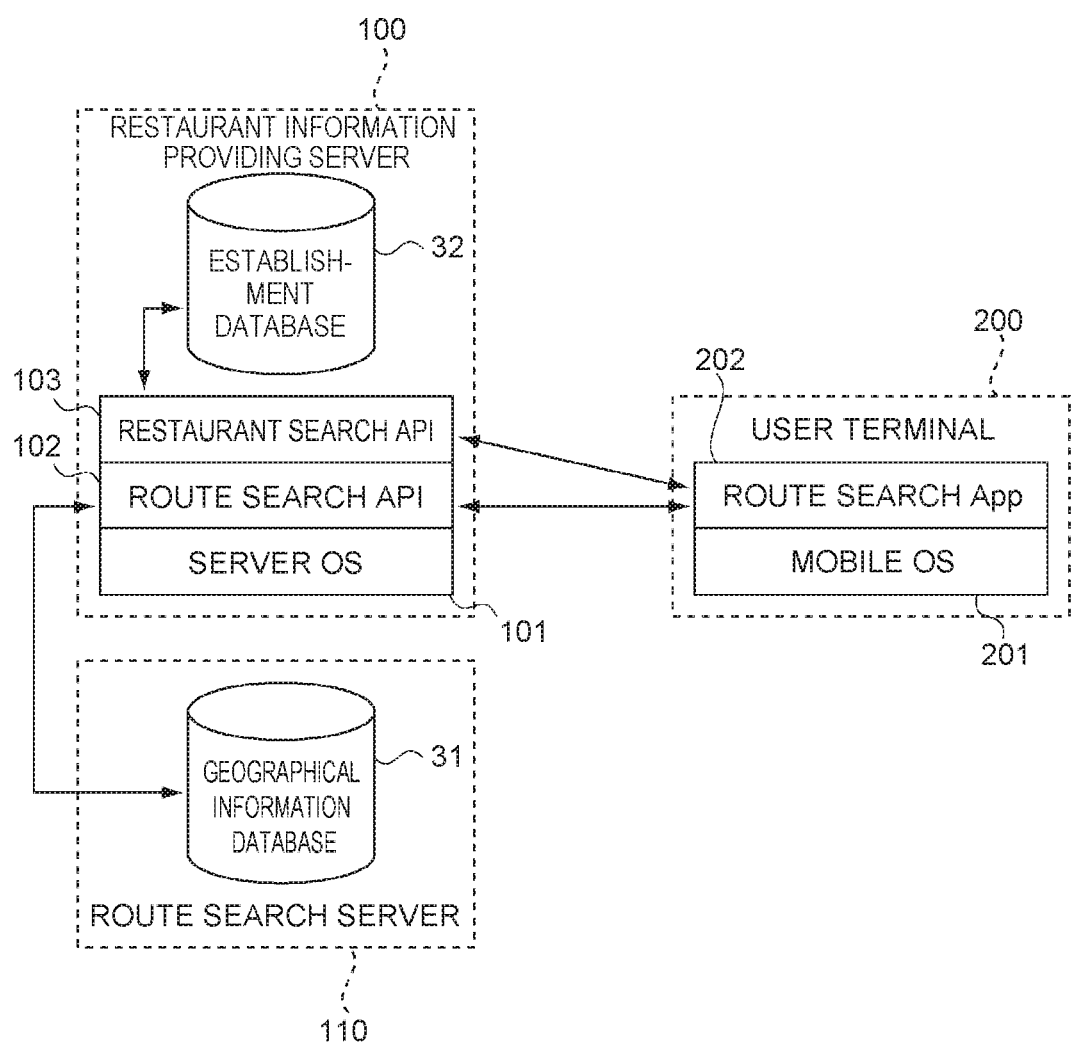
FIG. 4 is a diagram illustrating a software program configuration example of the restaurant information providing system.

FIG. 4 illustrates an example of a software program configuration of the present embodiment. The illustrated configuration example is an example of a software program that performs predetermined information processing by utilizing hardware resources illustrated in FIG. 1 to FIG. 3, and, in the case where a configuration of the hardware resources is changed, the software program configuration can be changed in accordance with the change.

As illustrated in FIG. 4, on the user terminal 200 on which a mobile operating system 201 is being run, route search application 202 is being run.

Meanwhile, as illustrated in FIG. 4, on the restaurant information providing server 100, a server operating system 101 is being run as software. On the server operating system 101, a route search API (application program interface) 102 and a restaurant search API 103 are being run.

Basic functions of each software program will be described below. These software programs may be provided in a stored state in non-transitory tangible computer-readable storage media, such as a magnetic storage medium and an optical storage medium.

The route search application 202 performs inter-process communication with the route search API 102 and the restaurant search API 103 and transmits/receives data and information.

When location information on each of the point of departure and the destination is provided as parameters from the outside including the route search application 202 and other APIs, the route search API 102 transmits a route search instruction command in which at least geographical information on the point of departure and geographical information on the destination are set as parameters to the route search server 110 on the basis of the location information. The route search API 102 generates a display screen by causing a return value to be superimposed on, for example, map, or the like. The display screen may be transmitted to the route search application 202.

When the restaurant search API 103 receives the establishment search instruction command in which the geographical information and a search scope are set as parameters from the outside including the route search API 102 and the route search application 202, the restaurant search API 103 searches the establishment database 32 and returns establishment information that matches conditions.

In the present embodiment, a group of software programs including the server operating system 101 to be run on the restaurant information providing server 100 realizes provision of the functions by causing various kinds of hardware, particularly, the CPU 11 to execute information processing through procedures described in detail below by utilizing the hardware resources described with reference to FIG. 1 to FIG. 3.

<Use Case>

First, a use case of the restaurant information providing system 1 according to the present embodiment will be schematically described below, and, then, processing to be executed by each of the restaurant information providing server 100 and the user terminal 200 will be described.

Figure 5:
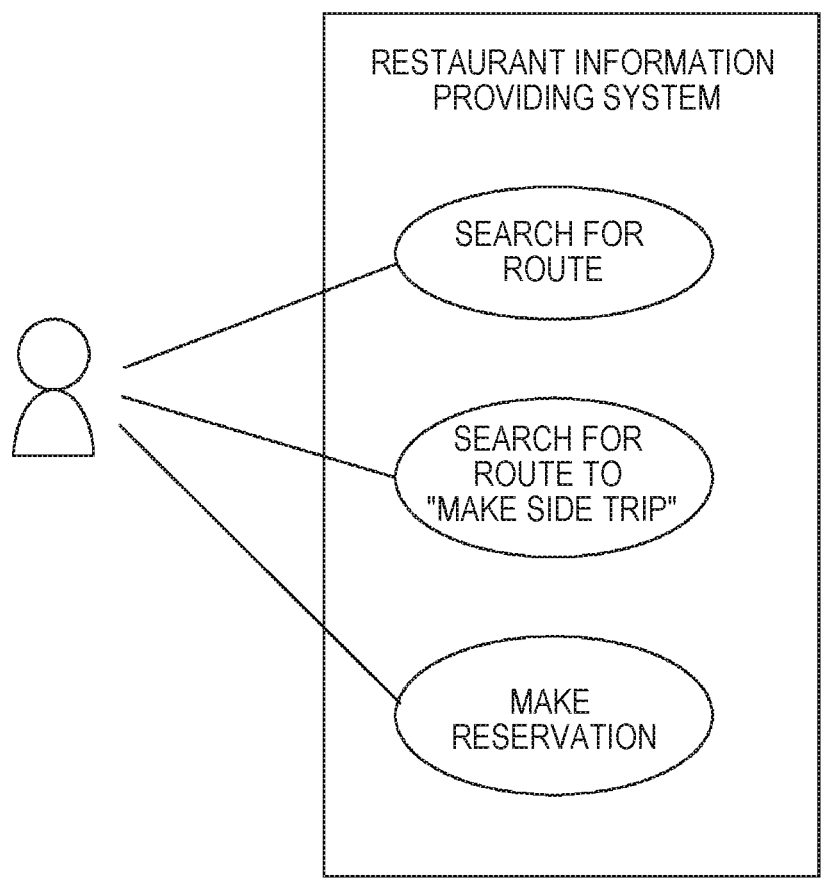
FIG. 5 is a use case diagram of the restaurant information providing system.

Referring to FIG. 5, a use case diagram of the restaurant information providing system 1 is illustrated. As illustrated in FIG. 5, the user can perform operation such as "search for a route", "search for a route to 'make a side trip'" and "make a reservation" as a main user who utilizes the restaurant information providing system 1. The restaurant information providing system 1 provides functions of "executing route search", "executing search for a route to 'make a side trip'" and "executing a reservation" in response to the user operation. Note that the use case disclosed in FIG. 5 is merely an example, and the restaurant information providing system 1 may be configured as a system that can provide a wide variety of functions other than these functions.

Here, "search for a route to make a side trip" indicates a function of the restaurant information providing system 1 searching for a restaurant to allow the user to make a side trip to have a meal while traveling on the mobile object 300 on a pleasure trip, a trip, a business trip, or the like, and providing information to the user.

Processing on the restaurant information providing system 1 side for providing a function of "searching a route" includes processing of the user terminal 200 presenting a user interface for allowing the user to input information necessary for searching for a route, such as the point of departure and the destination, processing of the restaurant information providing server 100 making an inquiry to the route search server 110 using the point of departure and the destination as parameters on the basis of information collected through the same user interface, or the like.

Processing on the restaurant information providing system 1 side for providing a function of "searching for a route to 'make a side trip'" includes, processing of the user terminal 200 presenting a user interface for causing the user to give an instruction of executing "search for a route to make a side trip", processing of the restaurant information providing server 100 searching the establishment database 32 in the case where an instruction of executing "search for a route to make a side trip" is given through the same user interface, processing of the user terminal 200 providing display output of the search result to the user, or the like.

Processing on the restaurant information providing system 1 side for providing a function of "executing a reservation" includes processing of the user terminal 200 presenting a user interface for causing the user to input information necessary for changing search conditions, processing of the restaurant information providing server 100 resetting search conditions on the basis of information collected through the same user interface, processing of performing processing to be executed by the restaurant information providing server 100 upon provision of the function of "executing search" again, or the like.

While each of the functions may be individually provided to the user, in the following description, an aspect is disclosed where a function of "searching for a route to make a side trip" is combined when the restaurant information providing system 1 provides the route search function. According to this aspect, synergistic effects that high value is added to the route search function is provided.

<Route Search User Interface>

Figure 6:
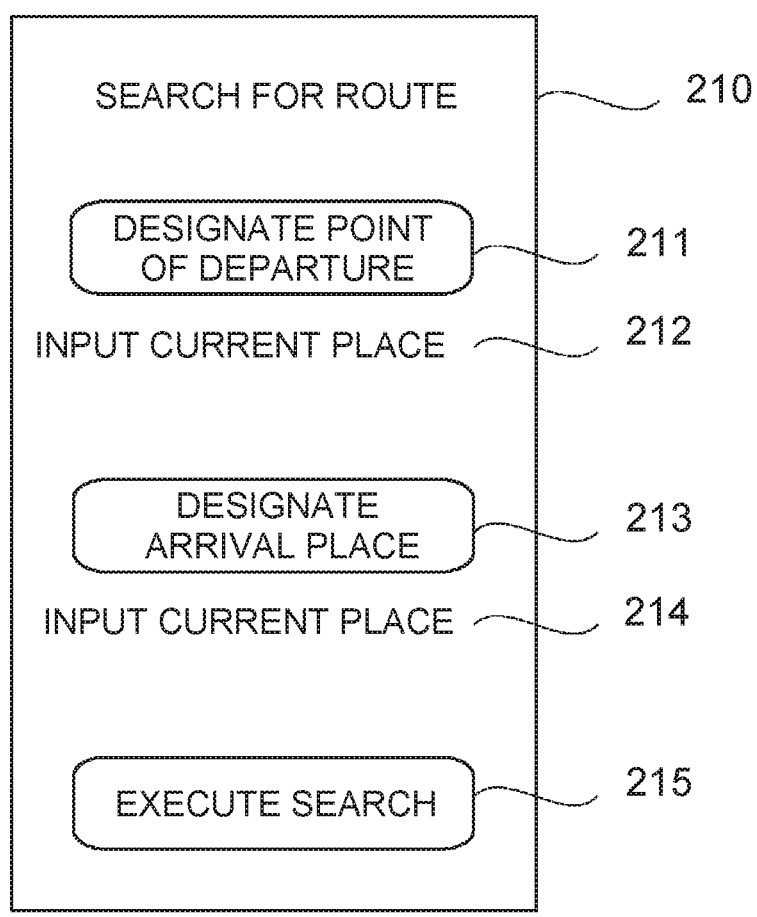
FIG. 6 is a diagram illustrating an example of a display screen for route search of the user terminal in FIG. 1.

FIG. 6 illustrates an example of a display screen for route search of the user terminal 200. The restaurant information providing system 1 provides a user interface as illustrated in FIG. 6 when the user utilizes the route search function. At this time, the restaurant information providing server 100 creates the display screen, and the user terminal 200 outputs the display screen as a display screen of the route search application 202.

In FIG. 6, the display screen 210 is the display screen of the route search application 202. The display screen 210 may be created so as to include display elements such as a departure place input unit 211, a current place input unit 212, an arrival place input unit 213, a current place input unit 214 and a search execution instructing unit 215.

The departure place input unit 211, which is a user interface provided for allowing the user to input a planned point of departure, may employ a form where a free word of geographical information such as latitude and longitude or geographical name is input or may employ a form where geographical information or geographical name is selected in a pull-down manner. When the user selects the current place input unit 212, the current place input unit 212 automatically inputs geographical information acquired by a GPS (Global Positioning System), or the like, to the departure place input unit 211.

The arrival place input unit 213, which is a user interface provided for allowing the user to input a planned place of arrival, may employ a form where a free word of geographical information such as latitude and longitude or geographical name is input or may employ a form where geographical information or geographical name is selected in a pull-down manner. When the user selects the current place input unit 214, the current place input unit 214 automatically inputs geographical information acquired by the GPS (Global Positioning System), or the like, to the arrival place input unit 213.

The search execution instructing unit 215 is a user interface for transmitting each of search conditions set by the departure place input unit 211 and the arrival place input unit 213 to the restaurant information providing server 100 using the "point of departure" and the "arrival place" as parameters. The restaurant information providing server 100 executes operation described below in response to input of these parameters and an instruction of executing route search.

<Operation of Restaurant Information Providing Server>

Figure 7:
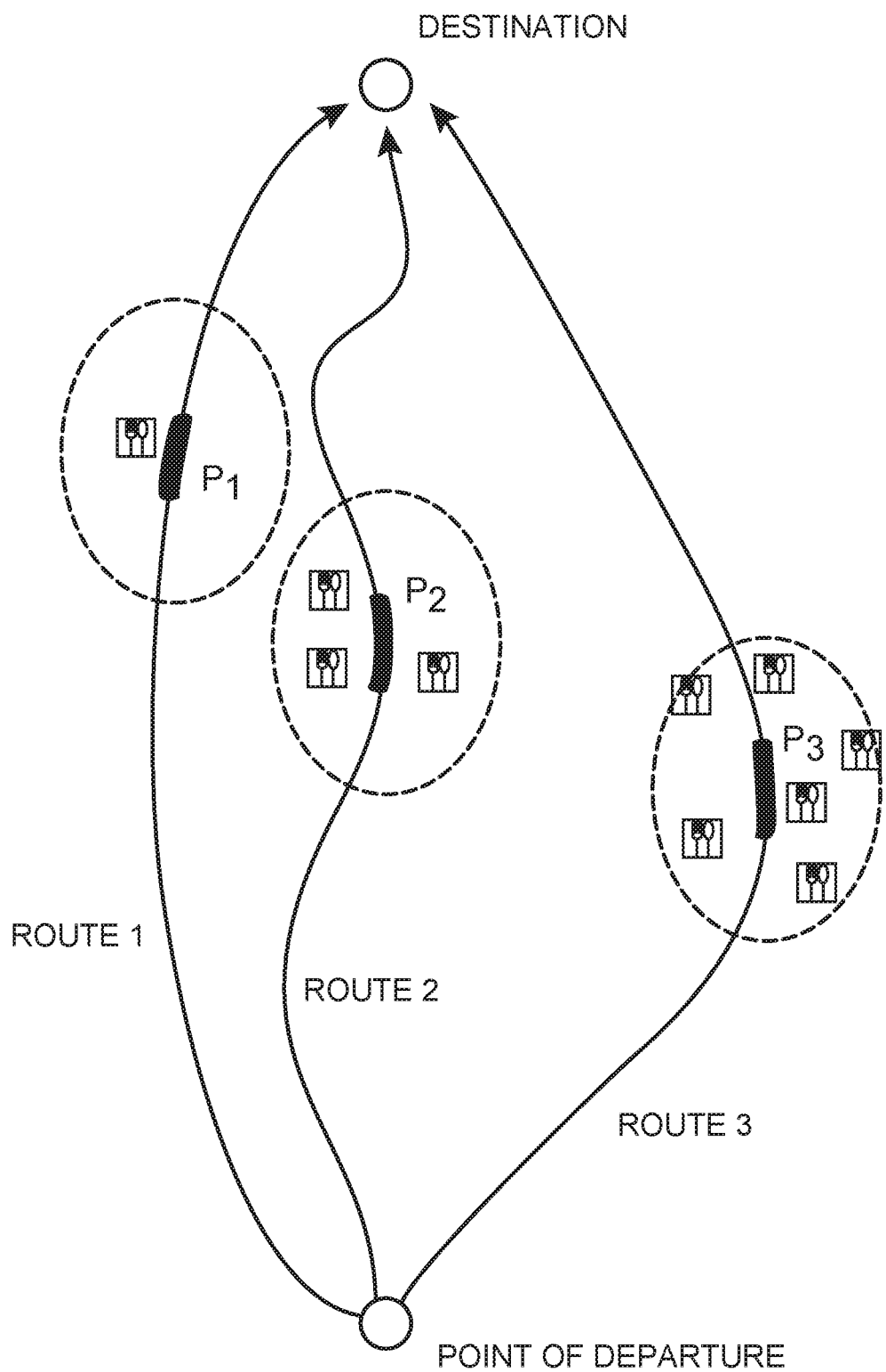
FIG. 7 is a schematic diagram for explaining information processing of the restaurant information providing server.
Figure 8:
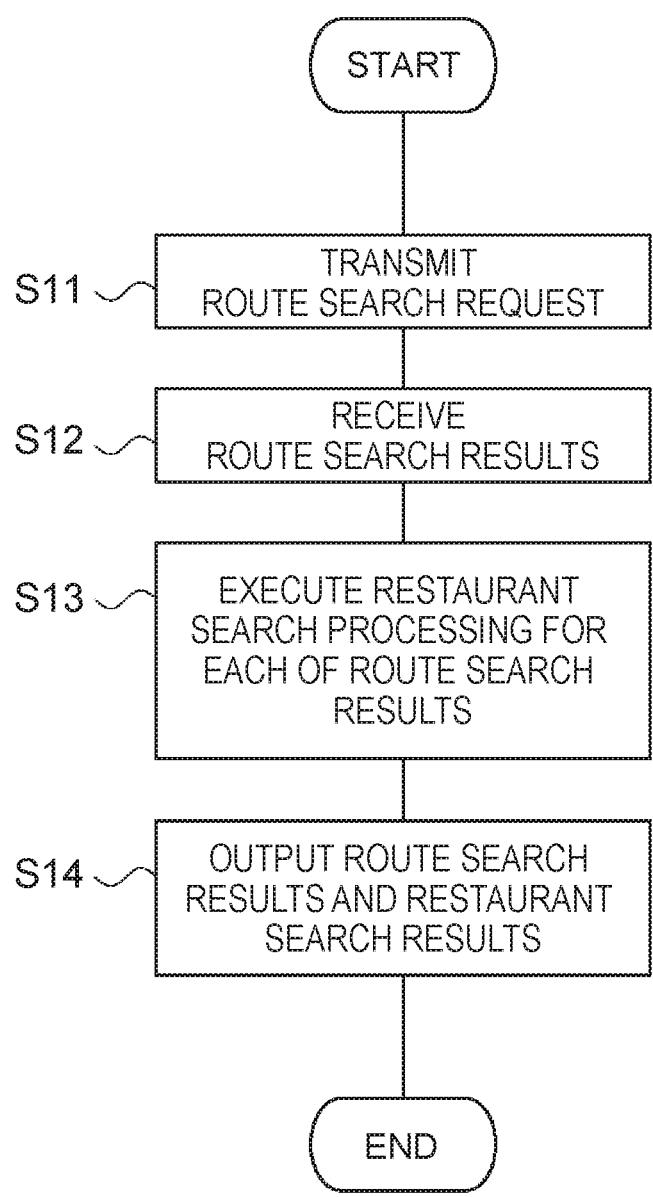
FIG. 8 is a diagram illustrating an example of flow of processing to be executed by the restaurant information providing server included in FIG. 1.
Figure 9:
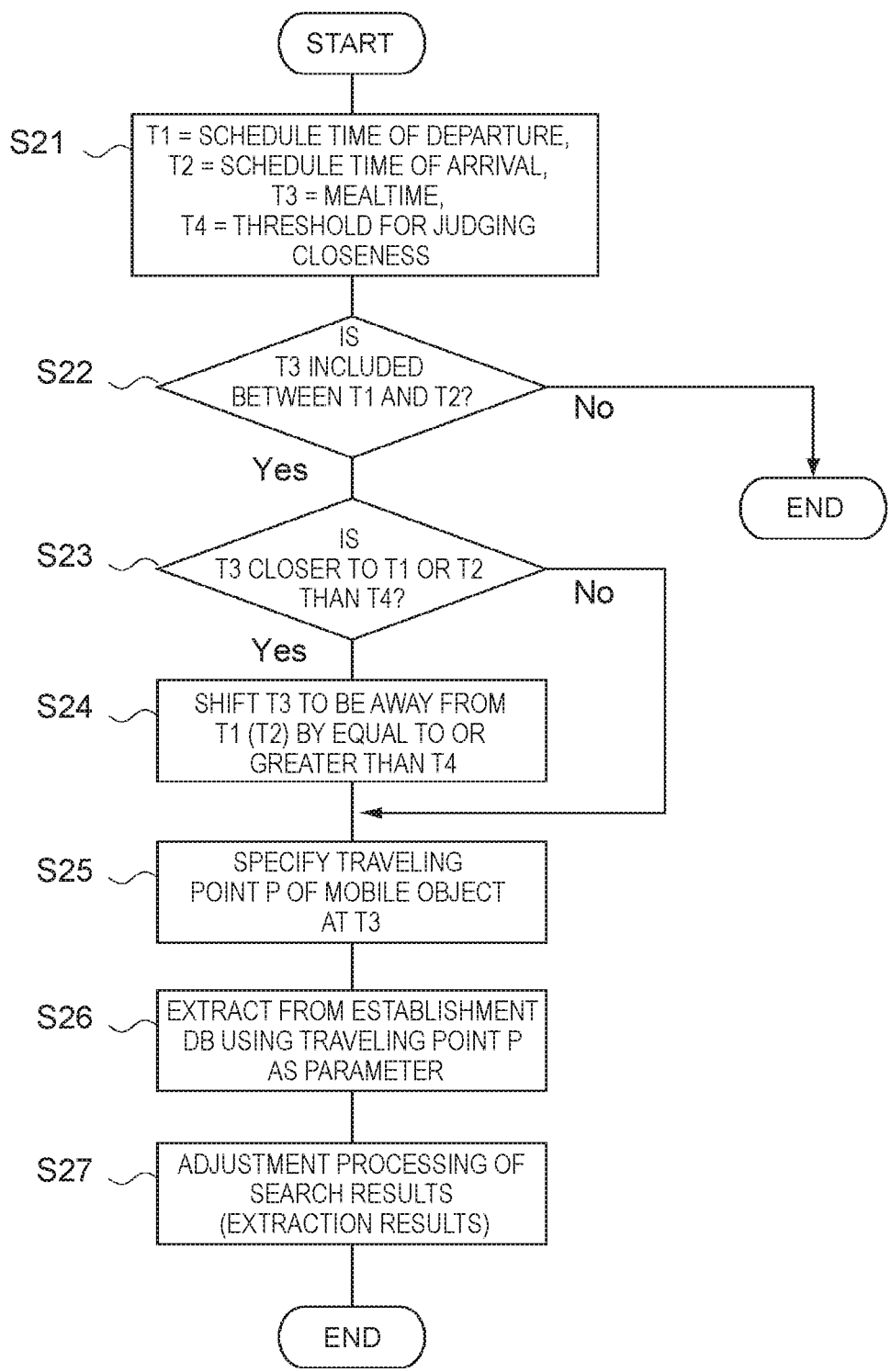
FIG. 9 is a diagram illustrating an example of flow of restaurant search processing in FIG. 8.
Figure 10:
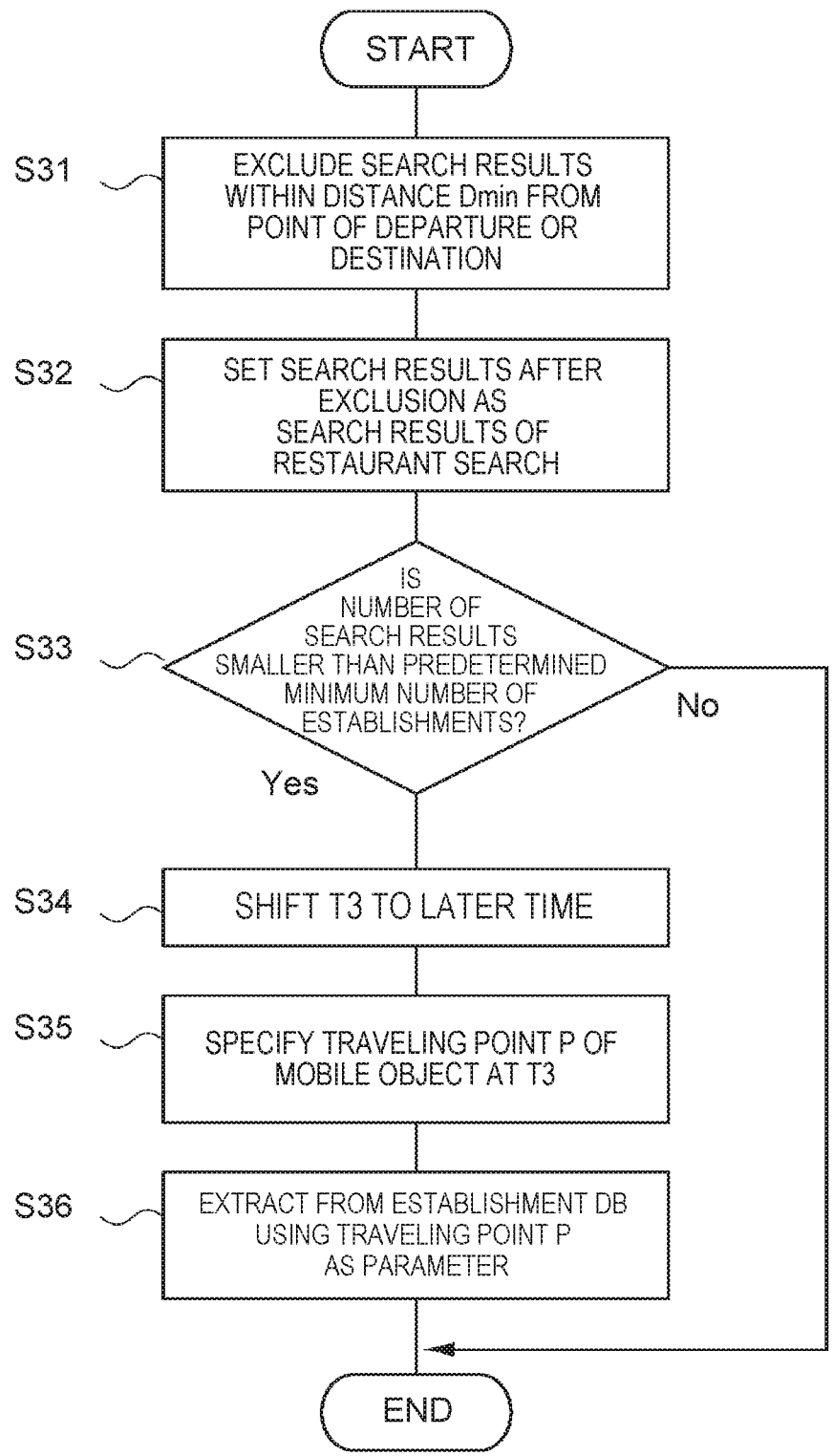
FIG. 10 is a diagram illustrating an example of flow of adjustment processing of search results in FIG. 9.

Flow of information processing to be executed by the restaurant information providing server 100 will be described below with reference to FIG. 7 to FIG. 10. FIG. 7 is a schematic diagram for explaining content of information processing to be executed by the restaurant information providing server 100. FIG. 8 is a diagram illustrating an example of flow of processing to be executed by the restaurant information providing server included in FIG. 1. FIG. 9 is a diagram illustrating an example of flow of restaurant search processing in FIG. 8. FIG. 10 is a diagram illustrating an example of flow of adjustment processing of search results in FIG. 9.

As illustrated in FIG. 7, according to the following information processing of the present embodiment, normally, one or more routes from a point of departure to a destination are searched for. In FIG. 7, a route 1, a route 2 and a route 3 are search results of route search output from the route search server 110.

According to the route search described with reference to FIG. 8, a plurality of routes such as a geographically shortest route, a temporally shortest route, and a route through which the user can easily travel (such as, for example, a route with a relatively small number of making a turn at an intersection and a route with a small number of transfers) are output as search results.

According to the restaurant information search processing described with reference to FIG. 9, restaurant information search is performed on each route. In FIG. 7, restaurants located within a first scope from a traveling point of the mobile object 300 during a mealtime T3 (which will be described later) indicated with P are searched for. Specific information processing will be described below with reference to FIG. 8 to FIG. 10.

Referring to FIG. 8, a procedure of processing to be executed by the CPU 11 of the restaurant information providing server 100 is illustrated. As illustrated in FIG. 8, the restaurant information providing server 100 (CPU 11) transmits a route search request to the route search server 110 (S11).

Subsequently, the restaurant information providing server 100 (CPU 11) receives the route search request from the route search server 110 (S12).

Subsequently, the restaurant information providing server 100 (CPU 11) generates search conditions of each of one or more route search results received from the route search server 110 and executes restaurant search processing on the search conditions (S13). The restaurant search processing executed here is performed in accordance with a procedure illustrated in FIG. 9.

Subsequently, the restaurant information providing server 100 (CPU 11) creates a display output screen on the basis of one or more route search results received from the route search server 110 obtained in S12 and the search results of the restaurant search processing obtained in S13 and outputs the display output screen to the user terminal 200 (S14).

Referring to FIG. 9, a procedure of the restaurant search processing to be executed by the CPU 11 of the restaurant information providing server 100 is illustrated. As illustrated in FIG. 9, first, the restaurant information providing server 100 (CPU 11) defines a variable used in the restaurant search processing (S21).

In S21, T1 is a schedule time of departure, T2 is a schedule time of arrival, T3 is a mealtime, and T4 is a threshold for judging whether or not the mealtime T3 is close to the schedule time of departure T1 or the schedule time of arrival T2. The restaurant information providing server 100 (CPU 11) uses the schedule time of departure and the schedule time of arrival included in the route search result received from the route search server 110 as T1 and T2. Note that, for the schedule time of arrival T2, a length (such as, for example, one hour) of the mealtime T3 may be added.

In S21, because a meal is basically had at the same time each day, the mealtime T3 may be determined to be a predetermined value by the restaurant information providing system 1. Because there is a case where there is a personal and cultural difference in a diet habit, the restaurant information providing system 1 may include a user interface for allowing the user to change the mealtime T3. Further, the threshold T4 may be determined to be a predetermined value by the restaurant information providing system 1. The restaurant information providing system 1 may include a user interface for allowing the user to change the threshold T4 in a similar manner to the mealtime T3.

Subsequently, the restaurant information providing server 100 (CPU 11) judges whether or not the mealtime T3 is included between the schedule time of departure T1 and the schedule time of arrival T2 (S22). In the case where the mealtime T3 is not included between the schedule time of departure T1 and the schedule time of arrival T2 (S22: No), the restaurant search processing is finished, and the processing of the restaurant information providing server 100 (CPU 11) transitions to S14 in FIG. 8.

In the case where the mealtime T3 is included between the schedule time of departure T1 and the schedule time of arrival T2 (S22: Yes), subsequently, the restaurant information providing server 100 (CPU 11) judges whether or not the mealtime T3 is close to the schedule time of departure T1 or the schedule time of arrival T2 on the basis of the threshold T4 (S23).

In the case where it is judged that the mealtime T3 is close to the schedule time of departure T1 or the schedule time of arrival T2 (S23: Yes), the restaurant information providing server 100 (CPU 11) shifts the mealtime T3 to leave at least equal to or greater than the threshold T4 from the time judged to be close to the mealtime T3 (S24). That is, in the case where the mealtime T3 is close to the schedule time of departure T1, T3 is reset to a later time. On the other hand, in the case where the mealtime T3 is close to the schedule time of arrival T2, T3 is reset to an earlier time.

Note that, in the case where the mealtime T3 is not close to the schedule time of departure T1 or the schedule time of arrival T2 (S23: No), step of S24 is skipped.

Subsequently, the restaurant information providing server 100 (CPU 11) estimates a traveling point P of the mobile object 300 at T3 (S25). As a specific method for estimating the traveling point P, the restaurant information providing server 100 (CPU 11) may issue a query to the route search server 110 using the mealtime T3 as a parameter, or may obtain the traveling point P through calculation on the basis of the route search result that has already been acquired from the route search server 110 in S12.

The information processing results in S25 are, for example, indicated as the traveling point P in FIG. 7. Each traveling point P indicated in FIG. 7 is a location where mobile object 300 is estimated to be traveling at the mealtime T3, the traveling point P is different for each route.

Subsequently, the restaurant information providing server 100 (CPU 11) issues a search query to the establishment database 32 using the traveling point P estimated in S25 as a search parameter of the establishment database 32 and receives the search result (S26). That is, the restaurant information providing server 100 (CPU 11) extracts information on a restaurant from the establishment database 32 using the traveling point P as a parameter.

The information processing result in S26 can be recognized as, for example, each restaurant indicated with a restaurant icon enclosed by dashed line in FIG. 7. FIG. 7 illustrates an example in the case where restaurants located within an ellipsoidal scope whose focus is an initial point and a last point of the location P. As illustrated in FIG. 7, the restaurant search server 100 (CPU 11) searches for restaurants located within a first distance from the location P where a belt-like mobile object is estimated to travel. Here, the "first distance" may be arbitrarily determined on the restaurant information providing system 1 side within a scope of a "side trip". The "first distance" may be, for example, defined by performing back calculation from a distance allowing a round trip from the route within one hour, or the like.

In the restaurant search in S26, search is performed while condition that restaurants are located a second distance away from at least one of the point of departure and the destination is set as one of search conditions. The second distance may be set on the system side, and, for example, a distance separates enough for the user to realize experience of "making a side trip" is set. The second distance is different from the threshold (T4, in units of time) for judging closeness used in S21 to S24 in FIG. 8.

Subsequently, the restaurant information providing server 100 (CPU 11) performs adjustment processing of the search results (results of extracting information on restaurants from the establishment database 32) obtained in S26 (S27), the restaurant search processing is finished, and the processing returns to flow in FIG. 8. Details of the adjustment processing of the search results will be described with reference to FIG. 10.

Referring to FIG. 10, a procedure of the adjustment processing of the search results (results of extracting information on the restaurants) in the restaurant search processing is illustrated.

First, the restaurant search server 100 (CPU 11) judges whether or not the number of extracted restaurants according to the search results of the restaurant search processing is smaller than a predetermined minimum number of establishments (S31). In the case where it is judged that the number of extracted restaurants according to the search results of the restaurant search processing is smaller than the predetermined minimum number of establishments (S31: Yes), the restaurant search server 100 (CPU 11) shifts the mealtime T3 to a later time (S32). That is, the mealtime T3 moves to a later time.

Note that this predetermined minimum number of establishments may be determined to be a predetermined value by the restaurant information providing system 1. Further, the restaurant information providing system 1 may include a user interface for allowing the user to change the predetermined minimum number of establishments. Still further, a shift width of T3 in S32 may be determined to be a predetermined value by the restaurant information providing system 1 or may be changeable.

The restaurant search server 100 (CPU 11) judges whether or not the number of extracted restaurants according to the search results of the restaurant search processing is smaller than the predetermined minimum number of establishments (S31). In the case where the predetermined minimum number of establishments is set at, for example, 1, in the case where there is no restaurant, the judgement result becomes Yes. In the case where the number of extracted restaurants is smaller than the predetermined minimum number of establishments in this judgement (S31: Yes), the restaurant search server 100 (CPU 11) estimates or specifies the traveling point P of the mobile object 300 during the shifted mealtime T3 following shifting (S32) of the mealtime T3 (S33). Then, the restaurant search server 100 (CPU 11) issues a search query to the establishment database 32 using the traveling point P as a parameter and extracts information on restaurants (S34). This processing in S33 is equivalent to the processing in S25. Further, the processing in S34 is equivalent to the processing in S26.

Note that, in the case where it is not judged that the number of extracted restaurants according to the search results of the restaurant search processing is smaller than the predetermined minimum number of establishments (S31: No), the restaurant search server 100 (CPU 11) skips processing from S32 to S34.

While, in the information processing procedure example illustrated in FIG. 10, an example where processing from S31 to S34 is performed only once is described, in the case where the number of restaurants in the search results is still smaller than the predetermined minimum number of establishments even after the restaurant search in S34, it is also possible to employ a configuration where processing from S31 to S34 is further repeated a plurality of times.

The processing of the restaurant search server 100 (CPU 11) transitions to output of the route search result and the restaurant search result in FIG. 8 (S14) after the adjustment processing of the search results illustrated in FIG. 10 is finished.

A display output screen will be described below that is created by the restaurant information providing server 100 (CPU 11) on the basis of one or more route search results received from the route search server 110 obtained in S12 and the search results of the restaurant search processing obtained in S13. This display output screen is output to the user terminal 200 (S14). Note that this display output screen is one aspect of output by the restaurant information providing server 100 (CPU 11).

<Display Output>

Figure 11:
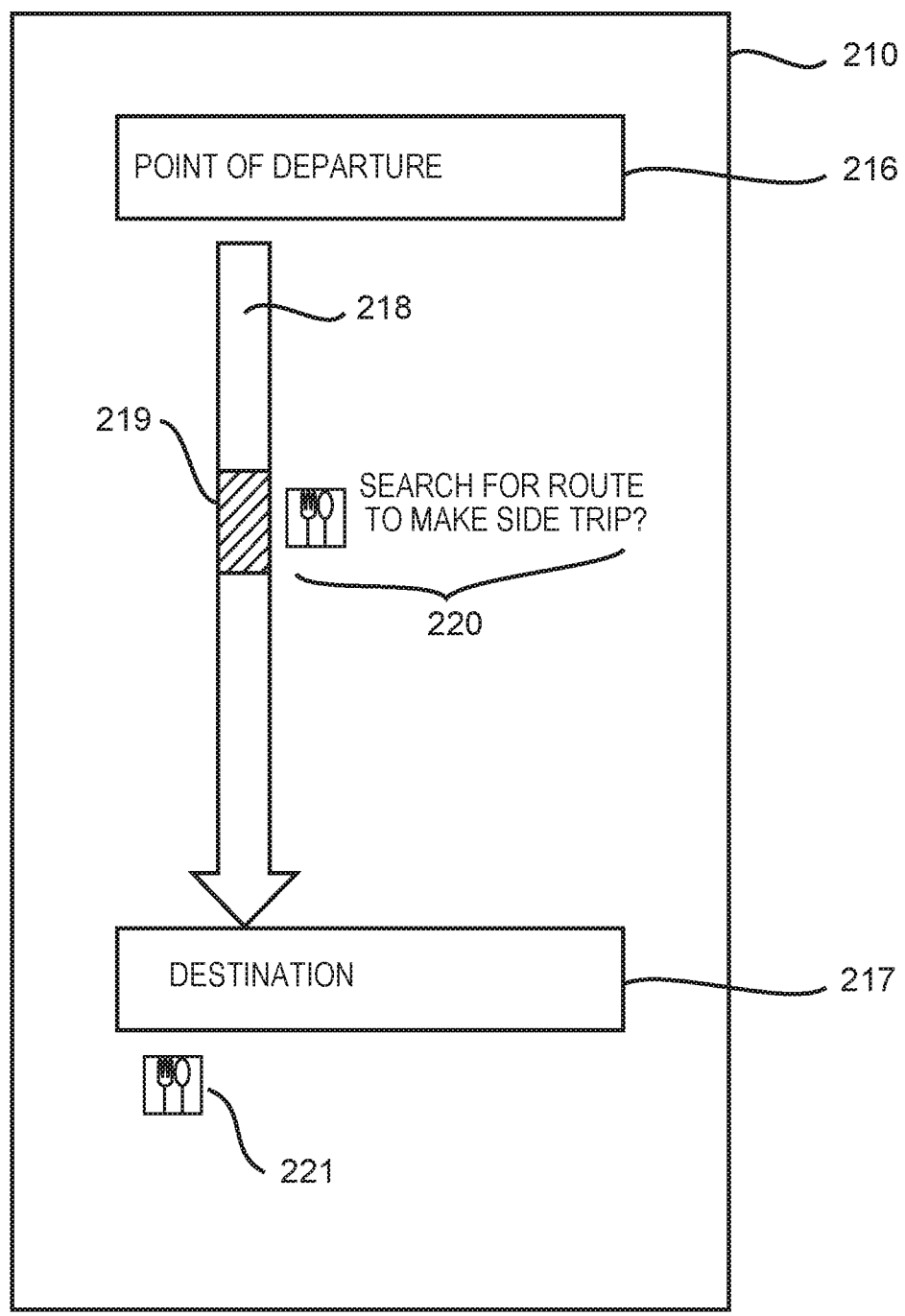
FIG. 11 is a diagram illustrating an example of a display output screen created by the restaurant information providing server in FIG. 1.

Referring to FIG. 11, an example of the display output screen created by the restaurant information providing server 100 (CPU 11) is illustrated. The display screen 210 in FIG. 11 is output by the user terminal 200 as the display screen of the route search application 202 in a similar manner to FIG. 6. The display screen 210 includes a display element 216 corresponding to the point of departure and a display element 217 corresponding to the destination as illustrated in FIG. 11. Further, the display screen 210 may include a display element 218 that indicates movement of the mobile object 300, connecting the display element 216 corresponding to the point of departure and the display element 217 corresponding to the destination. In FIG. 11, the display element 218 is indicated with an arrow.

In the present embodiment, a display element 220 that provides a link to the display output of the search results of the restaurant information search described with reference to FIG. 9 and FIG. 10 is output while the display element 216 corresponding to the point of departure and the display element 217 corresponding to the destination are output. The display element 220 may be accompanied by a display element 219 that is obtained by visualizing the mealtime T3 by causing the mealtime T3 to be superimposed on the display element 218 indicating movement of the mobile object 300.

FIG. 11 also describes a display element 221 for performing restaurant information search (or displaying a result of restaurant information search) using geographical information on the destination as a parameter. The display element 220 that provides link to the search result of "search for a route to make a side trip" is completely different from the display element 221 that provides link to such restaurant information search at the destination, and provides a user interface for searching for a restaurant at which the user can have a meal during a normal mealtime (mealtime T3). While there is a possibility that restaurant information at the destination may become information indicated at a timing that is not temporally appropriate, "search for a route to make a side trip" according to the present embodiment can propose a restaurant that can be utilized during a time period that is appropriate for a meal.

Figure 12:
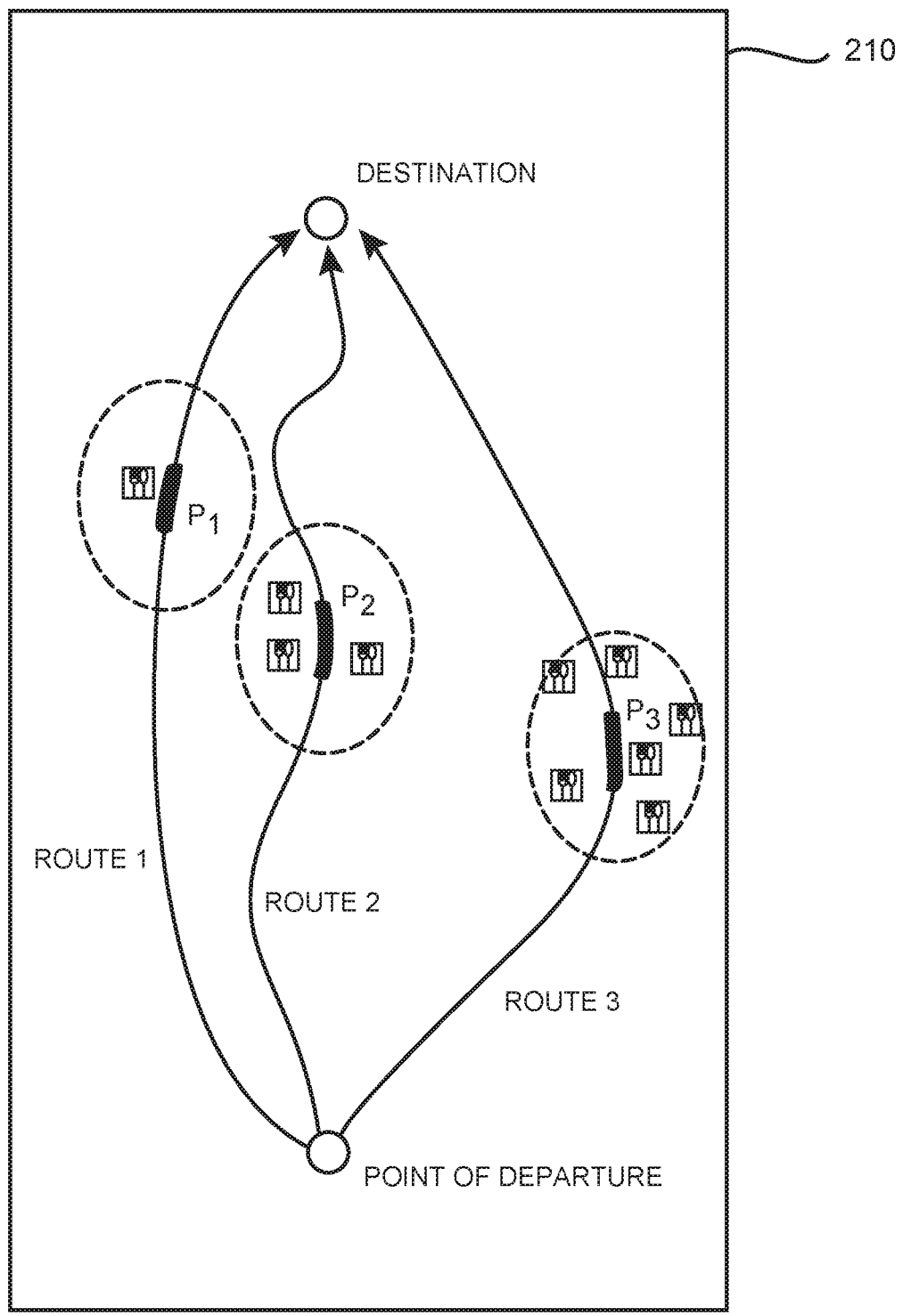
FIG. 12 is a diagram illustrating an example of a display output screen created by the restaurant information providing server in FIG. 1.

Referring to FIG. 12, an example of display output of the search results of the restaurant information search is illustrated. The restaurant information providing system 1 is configured to cause a screen to transition to a screen as illustrated in FIG. 12 in the case where the user selects the display element 220 that provides link to the display output of the search results of the restaurant information search in FIG. 11, or the like.

<Reservation Processing>

In the display output screen as illustrated in FIG. 12, calling of a function of "executing a reservation" as described with reference to the use case in FIG. 5 may be allocated. In this case, in FIG. 12, an icon indicating a restaurant is clickable. When a restaurant in FIG. 12 is selected by the user, the restaurant information providing server 100 (CPU 11) transmits a reservation request to the selected restaurant. The reservation request may include the mealtime T3 or may be configured as application by the user for receiving service of food and drink during the mealtime T3.

Further, the reservation request may include information on the number of people. The information on the number of people is the number of people who visit the establishment with the user, that is, the number of reserved people. The information on the number of people may be, for example, automatically acquired from the mobile object 300 by the user terminal 200. In the case where the mobile object 300 is a passenger vehicle that can recognize the number of people by a human sensor, or the like, and the user terminal 200 is a car navigation terminal provided on the mobile object 300, the user terminal 200 acquires the information on the number of people from the mobile object 300.

Modified Example

The embodiment can be, for example, implemented as follows.

Second Embodiment

While, in the above-described embodiment, it is assumed that the user continues to get on the mobile object 300, the user may travel from the point of departure to the destination while making connections with a plurality of mobile objects 300. Further, also in the case where such connections are taken into account, effects of the first embodiment are exerted.

In the present embodiment, in the case where the user travels using a plurality of mobile objects 300, in the configuration of the first embodiment, the restaurant search server 100 (CPU 11) determines whether or not a scheduled time of connection T5 is included in the mealtime T3 immediately before S25 (estimation of the traveling point P) of the restaurant information search processing (FIG. 9).

While, in the case where the scheduled time of connection T5 is included in the mealtime T3 in this judgment, the restaurant search server 100 (CPU 11) performs the same processing as that performed in the first embodiment, in the case where it is judged that the scheduled time of connection T5 is not included in the mealtime T3, the restaurant search server 100 (CPU 11) further judges whether or not the scheduled time of connection T5 is within a predetermined time scope from the mealtime T3. In the case where it is judged that the scheduled time of connection T5 is within the predetermined time scope, the restaurant search server 100 (CPU 11) changes the mealtime T3 so as to include the scheduled time of connection T5. This may be realized by shifting T3.

According to the present embodiment, it is possible to propose to have a meal during a connection, so that it is possible to realize a reasonable proposal.

Third Embodiment

While, in the above-described embodiments, a case is mainly assumed where only one mealtime T3 is included while the user is traveling, there may be a plurality of T3. In the present embodiment, in this case, a parameter such as a genre of a restaurant set upon restaurant information search for the first mealtime T3 is further made different from a parameter such as a genre of a restaurant set upon restaurant information search for the second mealtime T3.

In the present embodiment, in S26 in FIG. 9, a parameter indicating a type of a restaurant and a genre (such as a type and tendency of dishes) of service to be provided is made different. Note that this parameter is a parameter different from the parameter according to the traveling point P.

Fourth Embodiment

There is a case where a sufficient restaurant information search result cannot be obtained in the case where the user goes to a camp site. In the present embodiment, in preparation for such a case, immediately after S26 in FIG. 9, the following processing is performed. First, the restaurant search server 100 (CPU 11) judges whether or not there is a restaurant extracted in S26. Secondly, in the case where it is judged that there is no extracted restaurant, the restaurant search server 100 (CPU 11) searches for restaurants located from the traveling point P to the destination. Thirdly, in the case where it is judged that there is no extracted restaurant even through this search, that is, no restaurant is located from the traveling point P to the destination, the restaurant search server 100 (CPU 11) extracts restaurants located from the point of departure to the traveling point P. Fourth, a restaurant closest to the traveling point P among the restaurants extracted as a result of the third processing is output as the last restaurant.

According to the present embodiment, it is possible to introduce the last restaurant to the user without regard to a mealtime, so that it is possible to improve a degree of satisfaction of the user.

The present embodiment is not limited to the above-described embodiments and can be modified in various forms. For example, the embodiments may be modified such that processing except the restaurant search processing (FIG. 9) among processing executed by the restaurant information providing server 100 is executed by the user terminal 200.

The user terminal 200 generates search conditions of the restaurant search processing and transmits the search conditions to the restaurant information providing server 100. The restaurant information providing server 100 executes the restaurant search processing on the basis of the search conditions and returns a processing result to the user terminal 200. A hardware configuration example of the user terminal 200 is not limited, and, for example, the user terminal 200 may be configured as an in-vehicle terminal in a car navigation system.

Fifth Embodiment

As another modified example of the first embodiment, that can accomplish a task of making it possible to propose a meal at a location distant from the point of departure and the destination, a fifth embodiment will be described.

In the present embodiment, in the information processing performed by the restaurant information providing server 100, it is judged whether or not one of conditions that the mealtime T3 is after the schedule time of departure T1 and conditions that the mealtime T3 is before the schedule time of arrival T2 is satisfied instead of judging whether or not the mealtime T3 is included between the schedule time of departure T1 and the schedule time of arrival T2 (FIG. 8, S22). That is, if one of the conditions is satisfied, estimation of the traveling location of the mobile object during the mealtime T3 and restaurant search are performed.

In the present embodiment, for example, in the case where the mealtime T3 is after the schedule time of departure T1, if a recommended restaurant is located farther than the destination by a second distance, even if the recommended restaurant is not located between the point of departure and the destination, the restaurant is recommended. If the recommended restaurant is located a second distance away from the destination, even if the recommended restaurant is located in an opposite direction to a route from the point of departure to the destination, the restaurant is recommended according to the present embodiment.

According to the present embodiment, even in the case where the point of departure and the destination are determined, and one of the schedule time of departure and the schedule time of arrival is determined, it is possible to propose a meal at a location distant from the point of departure and the destination.

What is claimed is:

1. An information processing apparatus comprising:
a control circuitry configured to:
determine a mealtime of a user included between a schedule time of departure of a mobile object carrying the user and a schedule time of arrival of the mobile object,
estimate a location where the mobile object is to be traveling during the mealtime,
generate search conditions of restaurant search for extracting restaurants located within a first distance from the estimated location and located at a second distance away from at least one of a point of departure and a destination of the mobile object, from restaurant information associated with location information, and
control a display to output a result of the restaurant search, and an interface indicating a movement of the mobile object on which the mealtime is superimposed,
wherein the control circuitry is further configured to, based on a time period between the mealtime and one of the schedule time of departure and the schedule time of arrival being less than a predetermined threshold, shift the mealtime such that the time period between the mealtime and the one of the schedule time of departure and the schedule time of arrival is equal to or greater than the predetermined threshold, and wherein the shifted mealtime is between the schedule time of departure and the schedule time of arrival.

2. The information processing apparatus according to claim 1, wherein the control circuitry is further configured to:

perform a route search for searching for a plurality of routes connecting the point of departure and the destination of the mobile object, estimate the location where the mobile object is traveling during the mealtime for each of search results of the route search, perform the restaurant search for each of the search results of the route search, and present a route with a largest number of pieces of the restaurant information extracted through the restaurant search among the plurality of routes.

3. The information processing apparatus according to claim 2, wherein the control circuitry is further configured to present a shortest route connecting the point of departure and the destination obtained through the route search at the same time as presentation of the route with the largest number of pieces of the restaurant information.

4. The information processing apparatus according to claim 1, wherein the control circuitry is further configured to provide display an output of a display element of the point of departure and a display element of the destination respectively corresponding to the point of departure and the destination of the mobile object and provide display output of display elements to restaurant search results linked to display output of the search results of the restaurant search based on outputting the search results of the restaurant search.

5. The information processing apparatus according to claim 4, wherein the control circuitry is further configured to:

acquire information on a number of people of a group including the user in the mobile object, and transmit the information on the number of people and a reservation request to a restaurant selected by the user through the display output of the search results of the restaurant search linked through the display elements to the restaurant search results.

6. The information processing apparatus according to claim 1, wherein the control circuitry is further configured to:

change the mealtime to a later time based on the search results of the restaurant search being less than a predetermined minimum number of establishments, update the location where the mobile object is to be traveling during the changed mealtime, and perform the restaurant search based on the updated estimated location.

7. The information processing apparatus according to claim 1, wherein the control circuitry is further configured to, based on a plurality of the mealtimes being included between the schedule time of departure and the schedule time of arrival, update one of parameters for filtering the search results in the restaurant search for one of the mealtimes different from a value for another mealtime in the restaurant search.

8. The information processing apparatus according to claim 1, wherein the control circuitry is further configured to, based on the user traveling while making connections with a plurality of the mobile objects, and a scheduled time of connections of the mobile objects falling within a predetermined time scope from the mealtime, perform restaurant search on the basis of a location of the user at the scheduled time of connections.

9. The information processing apparatus according to claim 1, wherein the control circuitry is further configured to:

extract restaurants located between the location where the mobile object is to be traveling during the mealtime and the destination of the mobile object through the restaurant search based on no restaurant being extracted through the restaurant search, extract restaurants located between the point of departure and the location where the mobile object is to be traveling during the mealtime through the restaurant search based on no restaurant being located between the location where the mobile object is to be traveling during the mealtime and the destination of the mobile object is extracted, and;

output a restaurant closest to the location where the mobile object is to be traveling during the mealtime as the last restaurant among the extracted restaurants.

10. The information processing apparatus according to claim 1, further comprising:

a storage circuitry storing a plurality of pieces of the restaurant information, wherein the control circuitry is further configured to extract a restaurant that matches conditions from the plurality of pieces of the restaurant information stored in the storage circuitry through the restaurant search.

11. The information processing apparatus according to claim 1, further comprising a communication circuitry, wherein the communication circuitry is configured to:

receive the schedule time of departure and the schedule time of arrival of the mobile object that travels while carrying the user, and a type of the mobile object from an external user terminal, wherein the control circuitry is further configured to estimate the location where the mobile object is to be traveling during the mealtime based on the type of the mobile object, and wherein the communication circuitry is configured to transmit search results of the restaurant search to the user terminal.

12. The information processing apparatus according to claim 1, wherein the mealtime of the user corresponds to at least one of a time after the schedule time of departure of the mobile object and a time before the schedule time of arrival of the mobile object.

13. The information processing apparatus according to claim 1, wherein the interface further includes a link to perform a route search for a route in which the user can make a side trip and return search results for the restaurant search based on the mealtime.

14. An information processing method to be executed by a processing circuitry of an information processing apparatus, the method comprising:

determining that a mealtime of a user is included between a schedule time of departure of a mobile object carrying the user and a schedule time of arrival of the mobile object, estimating a location where the mobile object is to be traveling during the mealtime;

generating search conditions of restaurant search for extracting restaurants located within a first distance from the estimated location and located at a second distance away from at least one of a point of departure and a destination of the mobile object, from restaurant information associated with location information; and controlling a display to output a result of the restaurant search, and an interface indicating a movement of the mobile object on which the mealtime is superimposed, wherein the determining the mealtime further comprises, based on a time between the mealtime and one of the schedule time of departure and the schedule time of arrival being less than a predetermined threshold, shifting the mealtime such that the time period between the mealtime and the one of the schedule time of departure and the schedule time of arrival is equal to or greater than the predetermined threshold, and wherein the shifted mealtime is between the schedule time of departure and the schedule time of arrival.

15. A non-transitory tangible computer-readable storage medium having a program stored therein the program causing a processing circuitry of an information processing apparatus to execute:

a procedure of determining that a mealtime of a user is included between a schedule time of departure of a mobile object carrying the user and a schedule time of arrival of the mobile object;

a procedure of estimating a location where the mobile object is to be traveling during the mealtime;

a procedure of generating search conditions of restaurant search for extracting restaurants located within a first distance from the estimated location and located at a second distance away from at least one of a point of departure and a destination of the mobile object, from restaurant information associated with location information; and a procedure of controlling a display to output a result of the restaurant search, and an interface indicating a movement of the mobile object on which the mealtime is superimposed, wherein the procedure of determining the mealtime further comprises, based on a time between the mealtime and one of the schedule time of departure and the schedule time of arrival being less than a predetermined threshold, shifting the mealtime such that the time period between the mealtime and the one of the schedule time of departure and the schedule time of arrival is equal to or greater than the predetermined threshold, and wherein the shifted mealtime is between the schedule time of departure and the schedule time of arrival.

* * * * *